United States Patent [19]

Sensibar

[11] 4,287,432
[45] Sep. 1, 1981

[54] VALVE POSITION DETECTING APPARATUS

[75] Inventor: Ezra Sensibar, Chicago, Ill.

[73] Assignee: David Sensibar Irrevocable Trust, Chicago, Ill.

[21] Appl. No.: 86,461

[22] Filed: Oct. 19, 1979

[51] Int. Cl.³ .............................................. B63B 35/30
[52] U.S. Cl. .................................... 307/116; 114/36; 340/686
[58] Field of Search ................ 307/116, 118; 340/686; 114/36; 200/84 C

[56] References Cited

U.S. PATENT DOCUMENTS

| 3,594,740 | 7/1971 | Comeau | 340/686 X |
| 3,896,280 | 7/1975 | Blake | 340/686 X |

Primary Examiner—L. T. Hix
Assistant Examiner—James L. Dwyer
Attorney, Agent, or Firm—Vogel, Dithmar, Stotland, Stratman & Levy

[57] ABSTRACT

A hopper valve module is adapted to be removably mounted in the well of a hopper of a hopper dredge vessel and includes a housing and a valve member movable with respect to the housing for opening and closing the hopper outlet. A transmitter tube containing longitudinally spaced-apart magnetic switches and associated resistors is carried by the housing, the switches being connected in circuit with resistors and coupled to power supply and indicating means in the vessel. A hollow sleeve is fixedly secured to the valve member and is disposed in surrounding telescopic relationship with the tube, the sleeve carrying a permanent magnet therein for sequentially actuating the magnetic switches as the valve member moves between its open and closed positions, the varying current through the assembly of switches and resistors indicating the position of the valve member.

16 Claims, 5 Drawing Figures

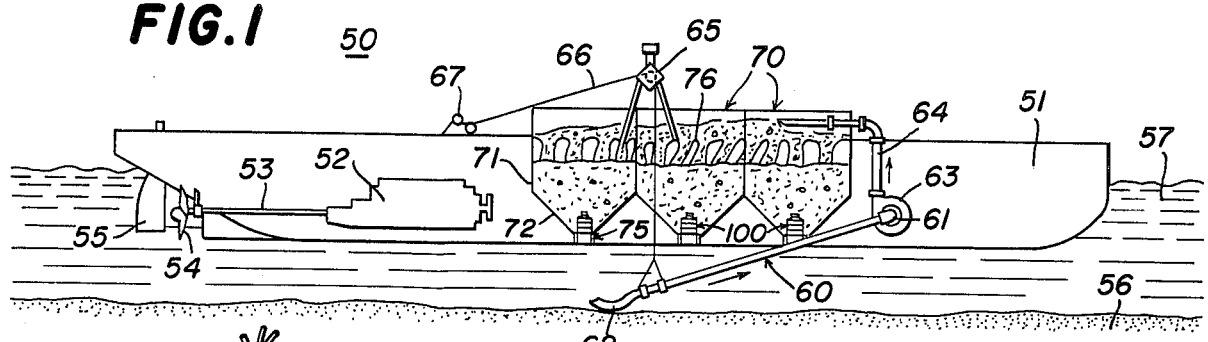
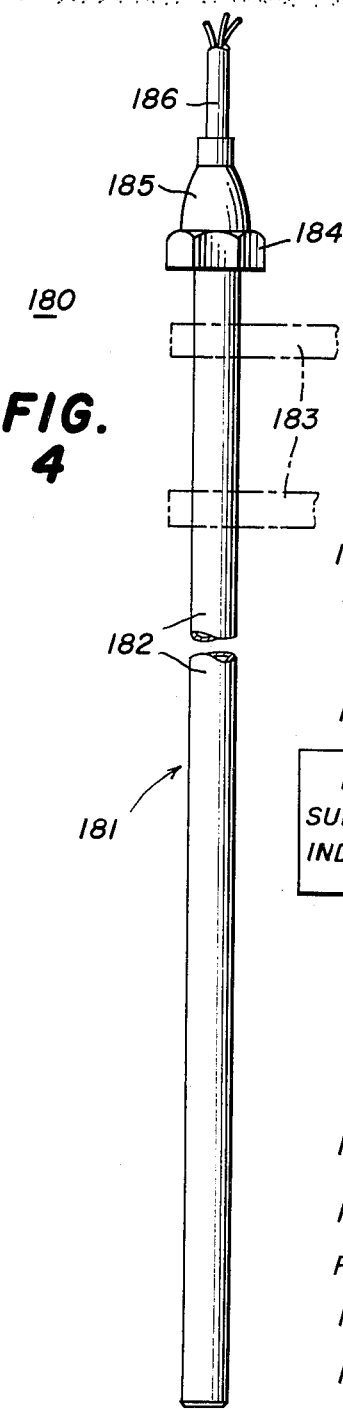
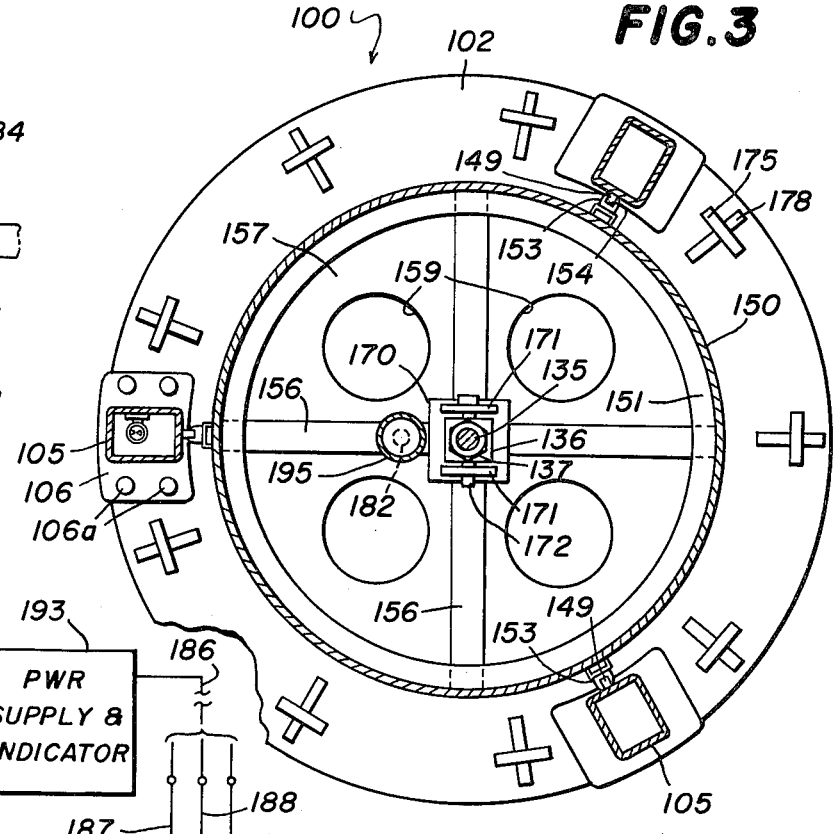
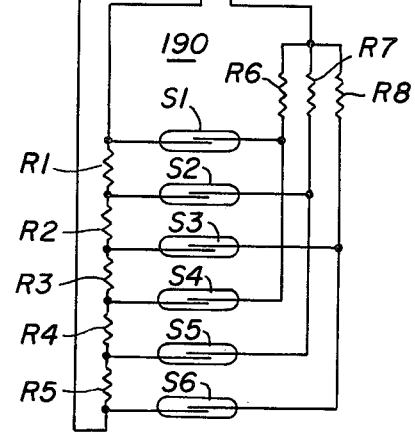

VALVE POSITION DETECTING APPARATUS

BACKGROUND OF THE INVENTION

The present invention relates to hopper valve modules of the type which are adapted to be removably mountable in the well of a hopper of a hopper dredge vessel. Such modules are disclosed in my U.S. Pat. No. 4,030,435.

During the operation of the hopper dredge vessel, the valve module is substantially inaccessible since it is located at the bottom of the hopper. Thus, when the valve is closed and the hopper is full, the valve module is covered with the dredged material stored in the hopper and, after the hopper has been emptied, the valve module is partially submerged in water.

As is explained in my aforementioned patent, because of the nature of the dredged material, which may often include large pieces of debris such as logs, large rocks and the like, the valve member can become jammed in a partially open or partially closed position. It is also possible, in the event of mechanical malfunction of the valve module, that the valve member might become jammed or stuck or otherwise fail to respond to control commands. Because of the inaccessibility of the valve module, the operator cannot tell what position the valve is in. Thus, for example, if it is noticed that a hopper load is not emptying properly, it could be because the valve member is stuck shut, or alternatively, it could be that the valve member is open, but that the dredged material is clogged or jammed at the hopper outlet because of the nature of the material. It is most useful for the operator to know the exact position of the valve member in the event of a problem, and this information is not available with prior modules.

Various types of position detecting and indicating systems are known in the prior art. For example, float-type tank level indicating systems are sold by Gems Sensors Division of Delaval Turbine, Inc. But such prior art position indicating systems are not suitable for use in the harsh environment in the bottom of a dredge hopper. The dredged material is typically very heavy and may include large solid objects as described above, and there is considerable turbulence in the vicinity of the hopper valve, particularly during the emptying of the hopper, which subjects the parts of the valve module to considerable buffering and stress.

SUMMARY OF THE INVENTION

The present invention relates to valve position detecting and indicating apparatus for the valve member of a hopper valve in a hopper dredge vessel.

It is a general object of this invention to provide a valve position detecting apparatus which avoids the disadvantages of prior art devices while affording other important structural and operating advantages.

It is an object of this invention to provide a valve position detecting apparatus which is of simple and economical construction and can be readily adapted for use with a removable hopper valve module.

It is another object of this invention to provide a valve position detecting apparatus which can withstand the forces and pressures exerted in the vicinity of the hopper valve of a hopper dredge vessel.

Another object of this invention is to provide a valve position detecting apparatus of the type set forth, which is readily detachable from the vessel along with the rest of the hopper valve module.

It is another object of this invention to provide a valve position detecting apparatus of the type set forth, which resists clogging or fouling by the dredged material.

These and other objects of the invention are attained by providing position detecting apparatus for a hopper valve member which is movable between open and closed positions with respect to a hopper outlet at the bottom of a hopper in a hopper dredge vessel provided with power supply and indicator means, said detecting apparatus comprising an elongated transmitter tube disposed in the hopper and fixedly positioned with respect thereto, a plurality of sensing devices disposed in said tube and spaced apart longitudinally thereof respectively to correspond to predetermined positions of the valve member, said sensing devices being operable between two conditions and being adapted for coupling to the associated power supply and indicator means to provide signals indicative of the conditions of said sensing devices, a protective sleeve fixedly secured to the valve member and movable therewith in surrounding telescopic relationship with said transmitter tube, and actuator means carried by said sleeve for movement past said sensing devices sequentially to operate same as said sleeve moves with the valve member between the open and closed positions thereof thereby to detect and indicate the position of the valve member.

Further features of the invention pertain to the particular arrangement of the parts of the valve position detecting apparatus whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a diagrammatic side elevational view of a self-propelled hopper dredge, with portions of the hull broken away to illustrate the hoppers, each including a hopper closure module constructed in accordance with and embodying the features of the present invention;

FIG. 3 is a view in horizontal section taken along the line 3—3 in FIG. 2;

FIG. 4 is an enlarged side elevational view of the transmitter tube of the position detecting apparatus of the present invention; and FIG. 5 is a vertically compacted electrical schematic circuit diagram of the sensing apparatus disposed within the transmitter tube of FIG. 4.

DESCRIPTION OF THE PREFERRED EMBODIMENT

Figure 2:
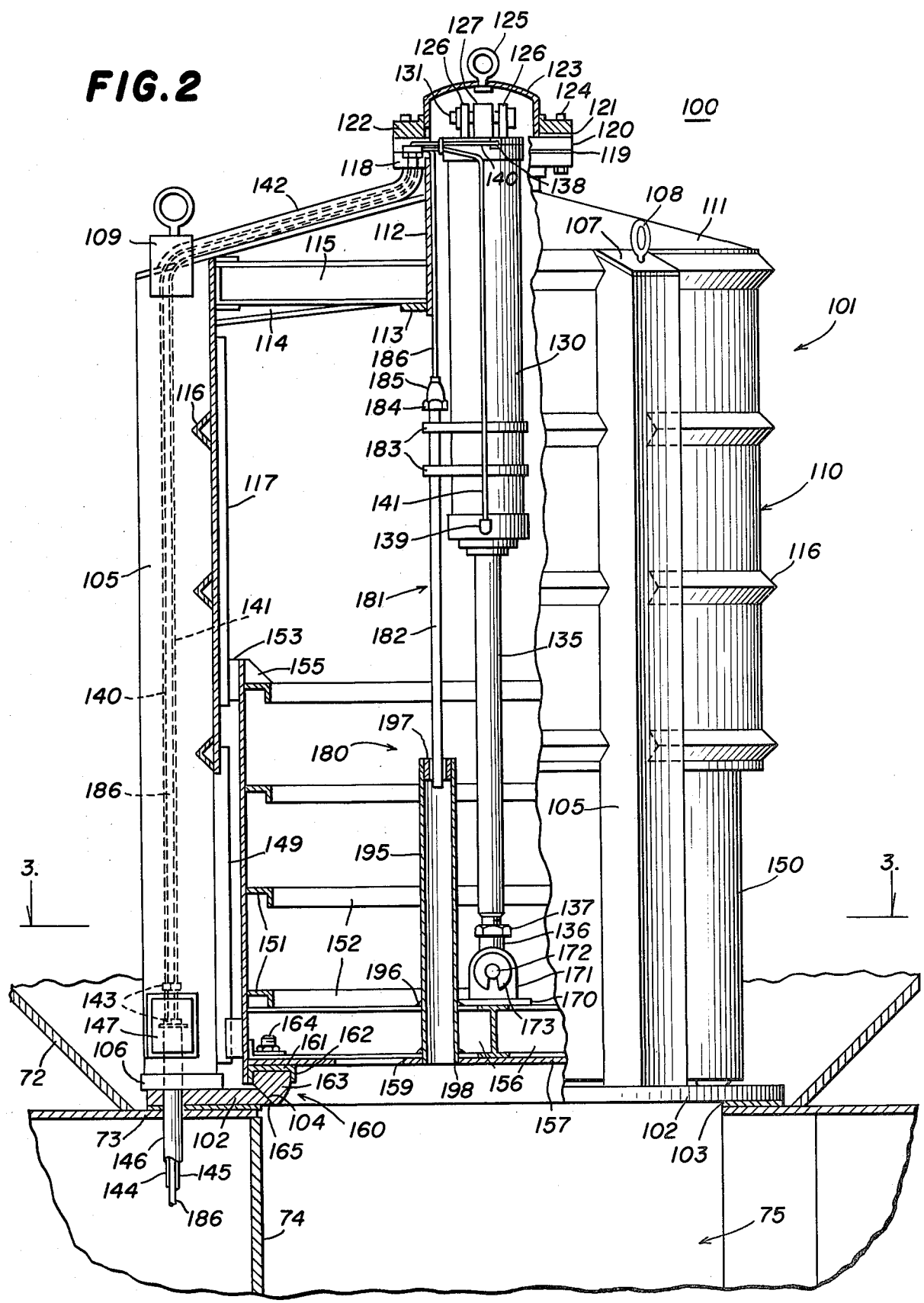
FIG. 2 is a side elevational view in partial vertical section of a hopper valve module with the valve shown in the closed position thereof, and illustrating the internal construction of the module to show the valve position detecting apparatus of the present invention.

There is illustrated in FIG. 1 of the drawings a hopper dredge vessel, generally designated by the numeral 50 having a plurality of hoppers therein, each generally designated by the numeral 70. For purposes of illustration, the hopper dredge vessel 50 has been illustrated as being self-propelled, but it will be appreciated that it may be of any of several types, including oceangoing vessels as well as non-self-propelled vessels. The hopper dredge vessel 50 includes a hull 51 carrying a propulsion engine 52 connected by a drive shaft 53 to a propeller 54, which cooperates with a rudder 55 for propelling the vessel. It will be understood that more than one such propulsion system may be provided on the vessel 50.

Carried by the hull 51 is a 60 pivotally mounted outboard of the starboard side of the hull 51 by a trunnion 61, the dragarm 60 extending aft from the trunnion 61 and being provided at its distal end with a drag 62 for scooping material from the bottom 56 of a body of water 57. The trunnion 61 is connected to a suction pump 63, which is in turn connected to a discharge pipe 64 which extends over the deck of the vessel 50 for depositing dredged material into the open tops of the hoppers 70. The vessel 50 is provided with a davit 65 carrying a cable 66 having one end thereof connected to the dragarm 60 adjacent to the drag 62 and having the other end thereof connected to hoist equipment 67 on the deck of the vessel 60, the cable 66 serving to raise and lower the dragarm 60 in a well-known manner.

Referring also to FIG. 2 of the drawings, each of the hoppers 70 is provided with a generally rectangular arrangement of upper side walls 71, each being integral at the lower end thereof with a downwardly and inwardly sloping wall 72, the lower ends of the sloping walls 72 terminating in and being joined by an annular generally horizontal ledge 73. Extending vertically downwardly from the ledge 73 around the entire perimeter thereof is a cylindrical wall 74 defining a well 75 which forms a discharge outlet for the hopper 70, the bottom end of the well wall 74 terminating at the bottom plates of the hull 51.

Above the deck of the vessel 50 and overlying the hoppers 70 is a flume 76 which is provided with a plurality of openings therein. Each opening is controlled by an adjustable gate. The dredged material from the discharge pipe or pipes 64 is directed into the flume 76 and the gates are so manipulated as to effect a substantially equal distribution of the dredged material among the several hoppers.

Referring now to FIGS. 2 and 3 of the drawings, there is illustrated a valve module, generally designated by the numeral 100. The valve module 100 is illustrated in FIG. 2 mounted in place around the upper end of the well 75 of a hopper 70, and includes a housing assembly, generally designated by the numeral 101, which includes an annular metal baseplate 102 disposed in use in surrounding relationship with the upper end of the well 75, and being supported upon the hopper bottom ledge 73 and spaced therefrom by an annular gasket 103. The baseplate 102 has a tapered inner edge defining a frustoconical seal surface 104 which overhangs the side wall 74 of the well 75 by a slight distance.

Supported upon the baseplate 102 at equiangularly spaced-apart points therealong and extending vertically upwardly therefrom are three hollow support columns 105, each being substantially rectangular in transverse cross section and having the lower end thereof fixedly secured as by welding to a footplate 106 which is in turn fixedly secured to the baseplate 102 by bolts 106a. Each of the support columns 105 is closed at the upper end thereof by a cover plate 107 to which an eyebolt 108 is secured, either directly or by means of a mounting bracket 109, the eyebolts 108 serving to facilitate lowering and raising the valve module 100 to or from its installed position illustrated in FIG. 2.

Fixedly secured as by welding to the inner surfaces of the support columns 105 is a circular cylindrical housing 110, disposed substantially coaxially with the well 75 and extending vertically downwardly from the tops of the columns 105 to a point slightly below the midpoints thereof, so that the bottom edge of the housing 110 is spaced a substantial distance from the bottom ledge 73 of the hopper 70 and cooperates therewith to define a passage beneath the housing 110. The top of the housing 110 is covered with a frustoconical cover plate 111, the inner edge of which is fixedly secured as by welding in a watertight joint to an inner cylinder 112 which projects upwardly and downwardly above and below the top of the cover plate 111 and is substantially coaxial with the housing 110. Fixedly secured to the inner cylinder 112 adjacent to the lower end thereof and extending radially outwardly therefrom is an annular stiffening flange 113.

Fixedly secured to the stiffening flange 113 and the inner cylinder 112 at equiangularly spaced-apart points therearound are three radially outwardly extending I-beams 114, the outer ends of which are fixedly secured to the upper end of the housing 110 at the support columns 105. Respectively extending between the outer ends of the radial I-beams 114 and fixedly secured thereto are three diagonal I-beams 115, and I-beams 114 and 115 cooperating with the inner cylinder 112, the housing 110 and the support columns 105 to provide a bracing assembly for the valve module 100 which serves to evenly distribute lateral forces applied to the valve module 100 by the dredged cargo in the hopper to prevent "tipping" of the valve module 100. Fixedly secured to the outer surface of the housing 110 and extending circumferentially thereabout between the support columns 105 are a plurality of vertically spaced-apart stiffening ribs 116, each being generally V-shaped in transverse cross section, with the apex of the V extending laterally. Respectively fixedly secured to the inner surface of the housing 110 at the support columns 105 are three elongated and vertically extending guide rails 117, each projecting radially inwardly of the housing 110 a slight distance.

Mounted on the inner cylinder 112 above the cover plate 111, and extending radially outwardly is a slip-on collar 118, an annular clevis plate 120 being supported on the collar 118 and spaced therefrom by a gasket 119. Overlying the clevis plate 120 and spaced therefrom by a gasket 121 is an annular slip-on collar 122, to the inner surface of which is secured a cap 123 for closing the upper end of the cylinder 112. The collars 118 and 122, the gaskets 119 and 121 and the clevis plate 120 are all preferably secured together by a plurality of bolts 124. Fixedly secured to the cap 123 is an eyebolt 125 to further facilitate raising and lowering of the valve module 100.

The clevis plate 120 is provided with a pair of upstanding spaced-apart clevis posts 126, between which is received the mounting tongue 127 of a hydraulic drive cylinder 130, the cylinder 130 being disposed beneath the clevis plate 120, with the mounting tongue 127 extending upwardly therethrough. Extending through complementary openings in the tongue 127 and the clevis posts 126 to form a pivot joint is a mounting pin 131, which is preferably headed on one end, the other end being held in place by a cotter pin [not shown], for supporting the drive cylinder 130. The drive cylinder 130 extends vertically downwardly beyond the lower end of the inner cylinder 112 coaxially therewith, and is provided with a piston rod 135, the lower end of which is provided with a coupling knuckle 136, the extension of which is adjustable by an adjustment nut 137, and is extendable in use well below the lower end of the housing 110.

The drive cylinder 130 is provided at the upper and lower ends thereof, respectively, with an extension fitting 138 and a retraction fitting 139, which are in turn respectively coupled to hydraulic lines 140 and 141, which extend through passages in the clevis plate 120 and the collar 118 and thence through a conduit 142 to the inside of one of the support columns 105. The hydraulic lines 140 and 141 extend downwardly through the columns 105 and are coupled at the lower ends thereof by swivel fittings 143 to hydraulic lines 144 and 145, which project from a cylindrical sleeve 146 which extends downwardly through complementary openings in the footplate 106, the baseplate 102, the gasket 103 and the hopper bottom ledge 73 into the hold of the vessel, and thence to an associated hydraulic system (not shown). Access to the swivel fittings 143 and to the sleeve 146 is provided by an access panel 147 in the lower end of the column 105. It will be appreciated that the hydraulic lines 140 and 141 could also be coupled to the hydraulic system of the vessel 50 by the use of a watertight coupling compartment, as explained in my aforementioned U.S. Pat. No. 4,030,435.

The valve module 100 also includes a circular cylindrical valve member 150 which is telescopically received within the cylindrical housing 110 coaxially therewith and has an axial extent slightly greater than the axial distance between the lower end of the housing 110 and the baseplate 102, the inner diameter of the valve member 150 being slightly greater than the inner diameter of the baseplate 102. Fixedly secured to the inner surface of the valve member 150 and extending circumferentially therearound are a plurality of vertically spaced-apart annular stiffening rings 151, each of which is provided with an integral and downwardly extending cylindrical flange 152 at the inner edge thereof. Fixedly secured to the outer surface of the valve member 150 respectively adjacent to the support columns 105 are three pairs of vertically aligned and spaced-apart guide shoes 153, the shoes 153 of each pair being respectively disposed adjacent to the upper and lower ends of the valve member 150. Each of the guide shoes is provided with a vertically extending slot or groove 154 in the outer surface thereof, the upper ones of the guide shoes 153 being respectively adapted to receive in the grooves 154 thereof the guide rails 117 in sliding engagement therewith, while the lower ones of the guide shoes 153 are disposed so that the slots 154 thereof respectively receive therein elongated guide rails 149 which respectively extend vertically downwardly along the inner surfaces of the support columns 105 from adjacent to the lower end of the housing 110 to adjacent to the lower ends of the columns 105, in vertical alignment with the guide rails 117. Preferably, mounting yokes 155 are provided at the upper end of the valve member 150 for mounting the upper ones of the guide shoes 153.

Fixedly secured to the inner surface of the valve member 150 adjacent to the lower end thereof at equiangularly spaced-apart points therealong are four radially inwardly extending I-beams 156, the inner ends of which are coupled together at the axis of the valve member 150. Fixedly secured to the bottoms of the I-beams 156 is a circular bottom plate 157 provided at the outer edge thereof with an integral downturned cylindrical attachment flange [not shown] secured to the inner surface of the valve member 150 as by welding. The bottom plate 157 closes the lower end of the valve member 150, but is provided with a plurality of circular openings 159 therein, to permit the drainage of water which may find its way inside the housing 110 and the valve member 150.

Fixedly secured to the underside of the bottom plate 157 is a bottom seal assembly, generally designated by the numeral 160, which includes an annular seal retainer plate 161 extending around the perimeter of the bottom plate 157 and having at the inner edge thereof an integral downwardly extending cylindrical flange 162. Nested beneath the seal retainer plate 161 between the flange 162 thereof and the flange of the bottom plate 157 is a resilient annular seal member 163, preferably fixedly secured to the valve member 150 by a plurality of bolts 164 and associated washer plates and nuts. The seal member 163 is provided with a downwardly and inwardly sloping annular frustoconical seal surface 165 disposed for mating engagement with the seal surface 104 on the baseplate 102 to provide a watertight seal therebetween.

Overlying the inner ends of the radial I-beams 156 and fixedly secured thereto is a clevis plate 170 having a pair of upstanding spaced-apart clevis legs 171 adapted to receive therebetween the coupling knuckle 136 of the piston rod 135. A headed coupling pin 172 extends through complementary openings in the coupling knuckle 136 and the clevis legs 171 for forming a pivot joint therebetween, a retaining collar 173 being provided for retaining the pin 172 in place. It will be understood that as the piston rod 135 is extended and retracted, the valve member 150 is moved vertically upwardly and downwardly between a closed position illustrated in FIG. 2, wherein the baseplate 102 and the seal member 163 are in sealing engagement with each other, and an open position (not shown) wherein the valve member 150 is pulled upwardly within the housing 110.

Fixedly secured to the inner surface of the housing 110 between the lower ends of the guide rails 117 and the upper ends of the guide rails 149 is an annular resilient side seal member [not shown], the details of which are disclosed in my aforementioned U.S. Pat. No. 4,030,435. The side seal member is disposed in sliding engagement with the outer surface of the valve member 150, thereby closing the space between the valve member 150 and the housing 110 and providing a substantially watertight seal therebetween, while accommodating vertical movement of the valve member 150.

Preferably, the bottom ledge 73 of the hopper 70 is provided with a plurality of upstanding dogplates 175 spaced around the perimeter of the well 75 a slight distance therefrom. Each of the dogplates 175 is generally in the shape of an upstanding bail having a passage or aperture extending therethrough radially of the valve module 100, the dogplates 175 being respectively received through complementary openings in the baseplate 102, and like openings in the gasket 103. When the valve module 100 is mounted in place on the hopper bottom ledge 73, the dogplates 175 extend well above the upper surface of the baseplate 102. A plurality of wedge members 178 are then respectively driven radially inwardly through the dogplate passages above the baseplate 102 for cooperation therewith securely to hold the valve module 100 in place on the hopper ledge 73.

In operation, it will be appreciated that when the valve module 100 is installed in place above the hopper well 75, with the valve member 150 in the closed position thereof, as illustrated in FIG. 2, the valve member 150 cooperates with the seal assembly 160 and the baseplate 102, and with the side seal member and the closed-top housing 110 completely to close the hopper well 75 and the associated hopper outlet, effectively preventing dredged material in the hopper from passing to and through the well 75.

When it is desired to empty the hopper contents, hydraulic fluid is applied to the lower end of the drive cylinder 130 for retracting the piston rod 135, thereby pulling the valve member 150 upwardly into the housing 110, this vertical movement being guided by the guide rails 117 and 149 and the guide shoes 153. When the valve member 150 is thus moved to its open position, the passage beneath the housing 110 is opened, permitting the dredged cargo in the hopper to flow beneath the housing 110 and around the lower ends of the support columns 105 through the well 75 and the hopper outlet. When the hopper contents have been completely discharged, the valve member 150 may be returned to its closed position by extending the piston rod 135 through the application of fluid to the upper end of the drive cylinder 130.

Referring now to FIGS. 2 through 5 of the drawings, it is a significant feature of the present invention that there is provided a position detecting assembly, generally designated by the numeral 180, for detecting and indicating the position of the valve member 150. The position detecting assembly 180 includes a transmitter assembly, generally designated by the numeral 181, which includes an elongated hollow tube 182 disposed alongside and substantially parallel to the axis of the drive cylinder 130 and fixedly secured thereto by a pair of mounting brackets or straps 183. The lower end of the tube 182 is closed, and the upper end thereof is coupled via a coupling nut 184 and a watertight fitting 185 to the lower end of a cable 186 provided with three electrical conductors 187, 188 and 189.

The tube 182 extends downwardly well below the lower end of the drive cylinder 130 and contains therein a sensor array (FIG. 5), generally designated by the numeral 190 which is electrically connected to the conductors 187–189 and which may be of the type made by the Gems Sensors Division of Delaval Turbine, Inc. as part of a tank level indicating system sold under the designation XM-36470. The sensor array 190 includes a plurality of normally-open magnetic switches spaced apart longitudinally of the tube 182, preferably equidistantly. Any number of the magnetic switches may be provided, depending upon the length of the tube 182, but six have been illustrated in FIG. 5 for purposes of illustration, and they are respectively designated S1 through S6. Connected in series between the conductors 187 and 188 are a plurality of resistors one less in number than the magnetic switches, these resistors being designated R1 through R5. The conductor 189 is connected in parallel to one terminal of each of three additional resistors R6, R7 and R8.

The magnetic switch S1 is connected between the conductor 188 and the other terminal of the resistor R6; the magnetic switch S2 is connected across the junction between the resistors R1 and R2 and the other terminal of the resistor R7; the magnetic switch S3 is connected across the junction between the resistors R2 and R3 and the other terminal of the resistor R8; the magnetic switch S4 is connected across the junction between the resistors R3 and R4 and the other terminal of the resistor R6; the magnetic switch S5 is connected across the junction between the resistors R4 and R5 and the other terminal of the resistor R7; and the magnetic switch S6 is connected across the conductor 187 and the other terminal of the resistor R8. The cable 186 extends upwardly from the transmitter assembly 181 and into the conduit 142 and thence along with the hydraulic lines 140 and 141 into the hold of the vessel 50 where it is connected to power supply and indicator means 193. Preferably, the power supply provides a DC output voltage in the range of between 10 and 40 volts DC, and the indicator means comprises a suitable current meter.

The position detecting assembly 180 also includes a hollow tubular sleeve 195 disposed within the valve member 150 and fixedly secured to the I-beams 156 as by weldments 196, with the lower end of the sleeve 195 communicating with a complementary opening 198 in the bottom plate 157 of the valve member 150. Disposed within the sleeve 195 and fixedly secured thereto at the upper end thereof is an annular permanent magnet 197 dimensioned to receive the tube 182 coaxially therethrough. The sleeve 195 is open at both ends and is disposed substantially coaxially with the tube 182 and has a length such that, when the valve member 150 is in its closed position illustrated in FIG. 2, the lower end of the tube 182 extends downwardly through the magnet 197 a predetermined distance into the upper end of the sleeve 195.

In operation, as the valve member 150 moves upwardly from its closed position to its open position, the sleeve 195 moves upwardly to envelop the tube 182. As the permanent magnet 197 passes each of the magnetic switches S1 through S6, it actuates that switch to a closed condition, and as the permanent magnet 197 moves past and away from the switch, it returns to its normal open condition. Thus, it will be understood that as the valve member 150 moves between its open and closed positions, the magnetic switches S1 through S6 are sequentially closed and opened by the movement past them of the permanent magnet 197, thereby to change the circuit paths through the sensor array 190 and thereby change the current therethrough, which varying current is sensed by the indicator to provide a positive indication of the position of the valve member 150.

More particularly, referring to FIG. 5, while three conductors 187–189 have been provided, in practice only two of the conductors will be used. Thus, the DC voltage source may be connected across the conductors 187 and 189 or across the conductors 188 and 189. Considering the former case as an example, the magnetic switches will preferably be so arranged that when the valve member 150 is in its closed position, the magnetic switch S6 will be closed, thereby providing a current path from the conductor 189 through the resistor R8 and the magnetic switch S6 to the conductor 187. As the valve member 150 moves upwardly from its closed position toward its open position, the magnetic switch S6 will open and the magnetic switch S5 will close to provide a path from the conductor 189 through the resistor R7 and the magnetic switch S5 and the resistor R5 to the conductor 187. Thus, it will be understood that when the valve member 150 is moved up to a position for closing the magnetic switch S5, the resistance in the circuit will be greater than it was when the valve member was closed and, accordingly, the current will be less.

It can be seen that the valve member 150 continues to move upwardly, as each succeeding magnetic switch is closed, it provides a path in which one additional resistor has been added to the circuit, so that the current continually decreases as the valve member 150 moves from its closed to its open position. In like manner, as the valve member 150 recloses, the current drawn by the sensor array 190 will increase. If desired, the resistors R1 through R8 may be selected and the indicator may be calibrated so that the change in current will be proportional to the distance through which the valve member 150 is moved.

If the conductor 188 is connected to the power supply and indicating means 193, instead of the conductor 187, the operation is essentially the same, except that in this case the current will increase as the valve member 150 opens and will decrease as it closes. It will also be appreciated that the number and spacing of the magnetic switches S1 through S6 may be chosen so that as the magnet 197 moves along the tube 182, each magnetic switch will close substantially at the same time as the preceding one reopens, thereby to minimize discontinuities in the current and make it virtually impossible for the valve member 150 to stop in a position in which none of the magnetic switches is closed. It can be seen that by the use of this arrangement, the operator can tell at a glance the position of the valve member 150.

It is a significant feature of the present invention that the more open the valve member 150 is, the more the tube 182 is enclosed within the sleeve 195, the parts being arranged and dimensioned so that when the valve member 150 is fully opened, substantially the entire length of the tube 182 beneath the mounting brackets 183 is enclosed within the sleeve 195. Preferably, the sleeve 195 is formed of steel or other suitably strong and rigid material so as adequately to protect the tube 182 from the forces and pressures exerted by the dredged material as it passes through the valve module 100. As is explained more fully in my aforementioned U.S. Pat. No. 4,030,435, when the valve member 150 is open, the interior of the valve module 100 is exposed to the water and to the contents of the hopper. Thus, it is another important feature of the invention that the lower end of the sleeve 195 remain open to permit the free flow of water therethrough thereby to provide a flushing action for the sleeve 195 and prevent the clogging thereof with dredged material.

From the foregoing, it can be seen that there has been provided an improved hopper valve module with means for detecting and indicating the position of the valve member while at the same time effectively protecting the detecting apparatus from damage by the dredged material in the hopper.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Position detecting apparatus for a hopper valve member which is movable between open and closed positions with respect to a hopper outlet at the bottom of a hopper in a hopper dredge vessel provided with power supply and indicator means, said detecting apparatus comprising an elongated transmitter tube disposed in the hopper and fixedly positioned with respect thereto, a plurality of sensing devices disposed in said tube and spaced apart longitudinally thereof respectively to correspond to predetermined positions of the valve member, said sensing devices being operable between two conditions and being adapted for coupling to the associated power supply and indicator means to provide signals indicative of the conditions of said sensing devices, an elongated protective sleeve fixedly secured to the valve member and movable therewith in surrounding telescopic relationship with said transmitter tube, said sleeve having a length sufficient to accommodate therein substantially the entire length of the transmitter tube, and actuator means carried by said sleeve for movement past said sensing devices sequentially to operate same as said sleeve moves with the valve member between the open and closed positions thereof thereby to detect and indicate the position of the valve member.

2. The position detecting apparatus of claim 1, wherein said transmitter tube extends substantially parallel to the direction of movement of the hopper valve member.

3. The position detecting apparatus of claim 1, wherein said transmitter tube is disposed substantially vertically.

4. The position detecting apparatus of claim 1, wherein said sensing devices are magnetically operable, said actuator means comprising a magnet.

5. The position detecting apparatus of claim 4, wherein said sensing devices comprise magnetic switches in circuit with predetermined resistances.

6. The position detecting apparatus of claim 1, wherein said sensing devices cooperate with the associated power supply means to provide an electric current which varies with the conditions of the sensing devices to indicate the position of the valve member.

7. The position detecting apparatus of claim 1, wherein said actuator means is disposed adjacent to one end of said protective sleeve.

8. The position detecting apparatus of claim 1, wherein at least a portion of said tube is disposed within said sleeve in all positions of the valve member, said tube being disposed entirely within said sleeve in the open position of the valve member.

9. The position detecting apparatus of claim 1, wherein said transmitter tube and said sleeve are disposed substantially vertically, said sleeve having an open bottom to accommodate the free flow of water therethrough.

10. The position detecting apparatus of claim 1, wherein said sensing devices are magnetically operable, said actuator means comprising an annular permanent magnet disposed within said sleeve coaxially therewith and fixedly secured thereto adjacent to one end thereof.

11. In a hopper valve module removably mountable as a unit in the hopper of a hopper dredge vessel provided with power supply and indicator means, wherein the module includes housing means mountable adjacent to the hopper outlet, a valve member movable between open and closed positions with respect to the hopper outlet, and drive means carried by the housing and coupled to the valve member for effecting movement thereof between the open and closed positions thereof, the improvement comprising an elongated transmitter tube carried by the housing and fixedly positioned with respect thereto, a plurality of sensing devices disposed in said tube and spaced apart longitudinally thereof respectively to correspond to predetermined positions of the valve member, said sensing devices being operable between two conditions and being adapted for coupling to the associated power supply and indicator means to provide signals indicative of the conditions of said sensing devices, an elongated protective sleeve fixedly secured to the valve member and movable therewith in surrounding telescopic relationship with said transmitter tube, said sleeve having a length sufficient to accommodate therein substantially the entire length of the transmitter tube, and actuator means carried by said sleeve for movement past said sensing devices sequentially to operate same as said sleeve moves with the valve member between the open and closed positions thereof thereby to detect and indicate the position of the valve member.

12. The hopper valve module of claim 11, wherein said transmitter tube is disposed within the housing.

13. The hopper valve module of claim 11, wherein said transmitter tube is carried by the drive means.

14. The hopper valve module of claim 11, wherein said sensing devices are magnetically operable, said actuator means comprising a magnet.

15. The hopper valve module of claim 14, wherein said actuator means comprises an annular permanent magnet disposed within said sleeve coaxially therewith and fixedly secured thereto adjacent to one end thereof.

16. The hopper valve module of claim 11, wherein said transmitter tube and said actuator means are disposed substantially, vertically, the bottom of said sleeve being open to permit the free flow of water therethrough.

* * * * *